July 10, 1934.  E. C. BOOTH ET AL  1,965,628
AUTOMOBILE RADIORECEIVER
Filed May 1, 1933   2 Sheets-Sheet 2

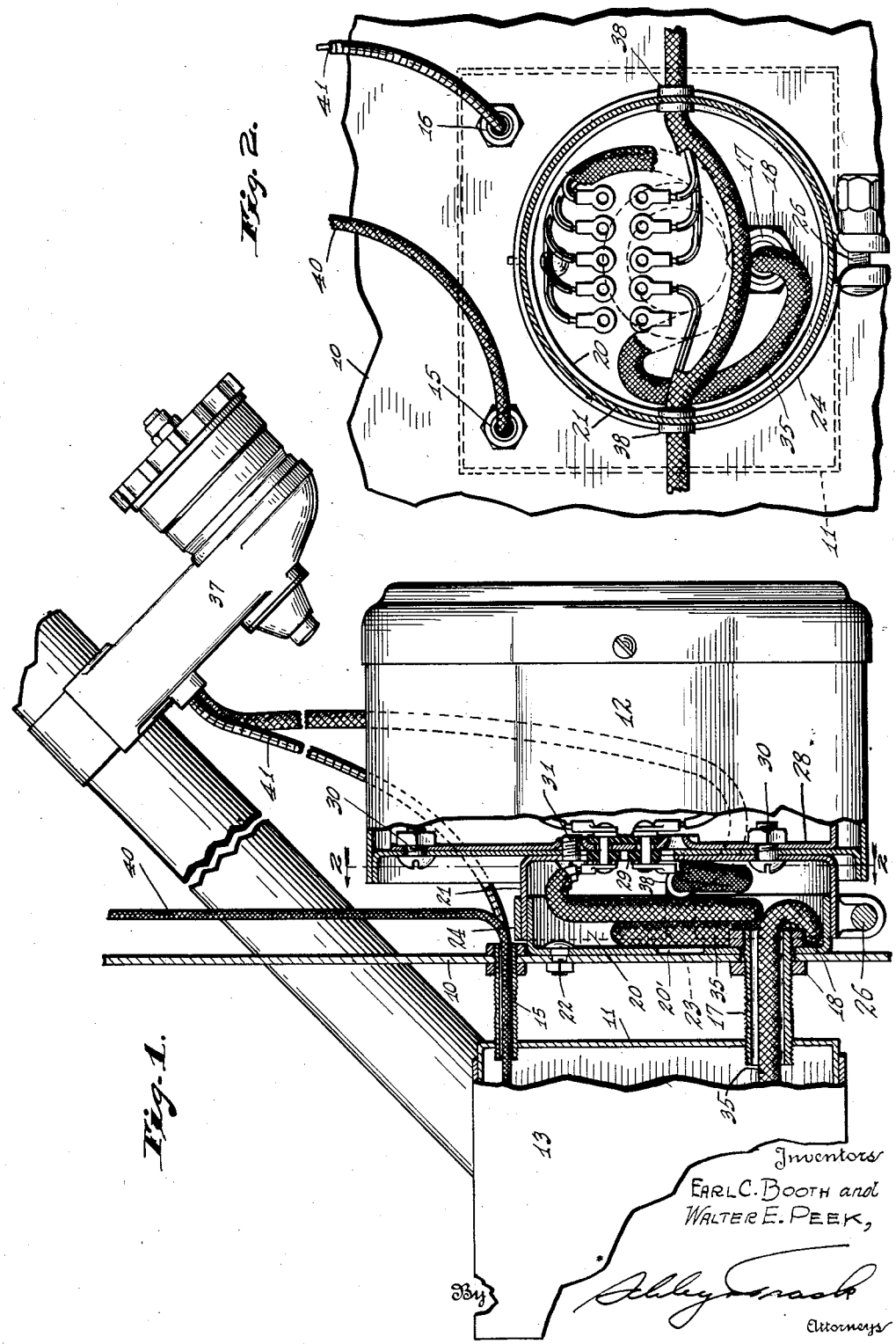

Inventors
EARL C. BOOTH and
WALTER E. PEEK,
By
Attorneys

Patented July 10, 1934

1,965,628

UNITED STATES PATENT OFFICE 1,965,628

AUTOMOBILE RADIORECEIVER

Earl C. Booth and Walter E. Peek, Columbus, Ind., assignors to Noblitt-Sparks Industries, Inc., Columbus, Ind., a corporation of Indiana Application May 1, 1933, Serial No. 668,776

18 Claims. (Cl. 250—14)

Our invention is concerned with radio receiving sets intended for installation on the dash boards of automobiles, and it is the primary object of our invention to facilitate the installation of a radio set in an automobile and to provide accessibility to the various parts of the set when once installed. More specifically it is our object to provide for the mounting of parts of the radio set, suitably enclosed in shielding casings, on opposite sides of the dash, to provide adjustment for the relative position of shielding casings located on opposite sides of the dash, and to decrease the number of holes which must be drilled in the dash to provide for the mounting of the casings and the passage through the dash of wiring and control means.

In carrying out our invention, we mount parts of the radio receiving apparatus on opposite sides of the dash-board of the automobile, preferably mounting the radio-frequency part of the set on the front side of the dash and the audio-frequency apparatus, including the speaker, on the rear side of the dash. The various portions of the radio apparatus on each side of the dash are enclosed in a suitable casing which, in the preferred embodiment of our invention, is clamped to the dash through the medium of hollow, threaded bushings, nuts on which serve to clamp the casings to the dash. These hollow bushings provide a path for wires extending through the dash. Conveniently, one of the threaded bushings mentioned is used as a common clamp for the two casings on opposite sides of the dash, and one of the casings is arranged to be adjustable relatively to such bushing.

Figure 3:
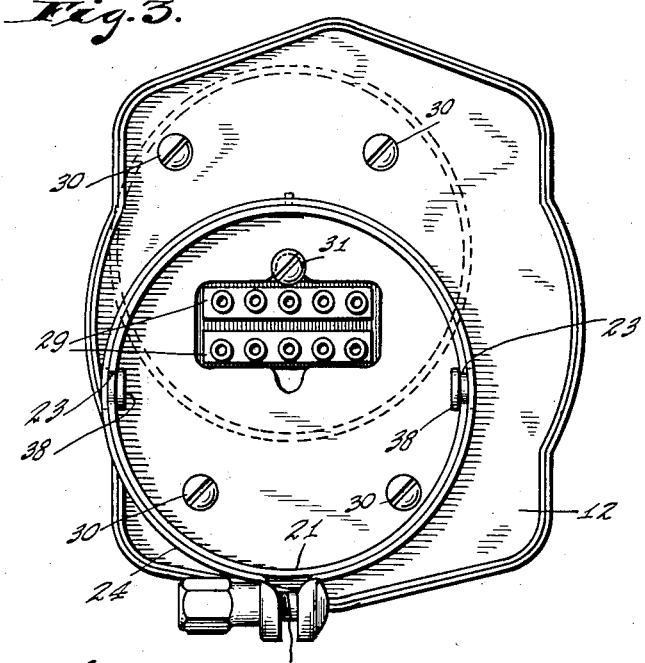
Figure 4:
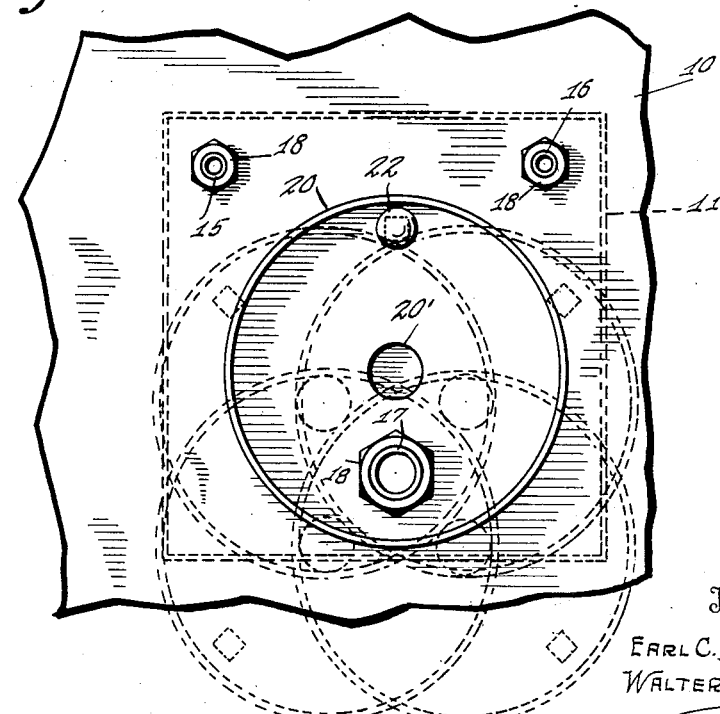

The accompanying drawings illustrate our invention: Fig. 1 is a vertical section through the dashboard of an automobile showing, largely in side elevation, the two casings in which the electrical apparatus constituting the radio receiving set is enclosed; Fig. 2 is a vertical section on the line 2—2 of Fig. 1; Fig. 3 is an elevation of the dash-side of the casing in rear of the dash; and Fig. 4 is an elevation of the rear side of the dash showing various adjustments of the casing-mounting means.

Our invention is not concerned with electrical features of the radio set except insofar as such features are affected by or affect the mechanical arrangement we employ. No attempt is made in the drawings, therefore, to illustrate the electrical apparatus.

As previously indicated, we provide on opposite sides of the dash board 10 of an automobile casings 11 and 12 in which the electrical apparatus of the radio receiving set is housed. The casing 11, which is located on the front side of the dash 10, may contain radio-frequency circuits and apparatus and may also have a removable cover 13. The casing 12, which is located on the rear side of the dash, may contain the remaining parts of the radio apparatus such as the power-pack, the audio-frequency amplifiers, and the speaker.

We prefer to mount the casing 11 on the dash 10 by means of three bushings 15, 16, and 17. These bushings pass through holes in the dash and are secured in any desired manner to the rear wall of the casing 11. The bushings are threaded for the reception of nuts 18 by which the casing 11 may be clamped in place.

As previously indicated, we prefer to employ one of the threaded bushings 15, 16, and 17 for the purpose of securing the casing 12 to the dash 10. Preferably, the mounting of the casing 12 is such that the position of the casing can be varied transversely of the automobile, both horizontally and vertically. This result is conveniently accomplished by arranging the casing 12 eccentric to the axis of the bushing, here shown as the bushing 17, through which it is mounted, whereby the casing may be secured in any position about such axis. As it is usually necessary, or at least desirable, that the casing 12 occupy a predetermined position relative to the vertical, whatever its location on the face of the dash, it may be made angularly adjustable about another axis spaced from the axis of the bushing 17. By this means, after the casing 12 is located about such bushing-axis, it may be rotated about the second axis to bring it into the desired position relative to the vertical.

A convenient method for securing the type of mounting described is through the use of oppositely disposed interfitting cup-shaped members 20 and 21, the former of which is adjustably secured to the dash 10 and the latter of which is attached to the casing 12. The cup 20 is provided in its bottom wall with an eccentric opening through which the bushing 17 passes. The nuts 18 on the bushing 17 are located respectively on the front face of the dash board 10 and within the cup 20 so that they can be tightened to hold the cup in place.

In installing the radio, the cup 20 may be adjusted to any desired angular position about the axis of the bushing 17, as indicated in dotted lines in Fig. 4. This enables the casing 12 in rear of the dash to occupy any of a variety of positions relative to the casing 11 in front of the dash.

When that adjustment of the cup 20 which results in the most desirable position of the casing 12 is obtained, the dash 10 may be drilled for the passage of a small bolt 22 by means of which the cup 20 is held against rotation about the axis of the bushing 17.

By providing the cup 20 with additional openings for the passage of the bushing 17, the range of possible variations of its position will be farther extended. One such additional opening 20', centrally located, is illustrated in the drawings.

To permit the angular adjustment of the casing 12 about the axis of the cup 20, the two cups 20 and 21 are relatively rotatable. To hold the casing 12 in the desired angular position relative to the cup 20, the cup 21 is provided in its cylindrical wall with diametrically opposite slots 23 and also with a clamp-ring 24 which may be tightened by means of a bolt 26 to contract the rim of the cup 21 and hold it in fixed position relative to the cup 20.

The possible range of variation in the position of the casing 12 can be materially increased by providing for the mounting of the cup 21 in a plurality of positions on the casing 12. To this end, we provide in the wall of the casing 12 and the bottom of the cup 21 alined openings through which electrical connections to the apparatus within the casing 12 may be made, and we locate the opening in the cup 21 in an eccentric position, as is clear from Fig. 3. By this arrangement, the cup 21 can be located in any of a plurality of positions of adjustment about the center of the alined openings in the cup and casing, and the position of the cup relative to the casing thus changed. Ordinarily, it will only be necessary to provide for two positions of the cup 21 relative to the casing 12, one of such positions being illustrated in full lines in Fig. 3 and the other in dotted lines in the same figure.

In order to facilitate electrical connections between the apparatus in the casing 12 and wiring external to the casing 12, we provide within the casing a sub-frame 28 which may carry the electrical apparatus (not shown) and on which there is mounted one or more contact blocks 29 in line with the opening in the wall of the casing 12. The sub-frame may be secured in the casing 12 by any convenient means, bolts 30 and a screw 31, the former passing through the casing-wall and sub-frame and the latter extending through the casing-wall into a screw-threaded opening in the sub-frame, being used for this purpose in the arrangement illustrated in the drawings. It is possible by proper arrangement of the bolts 30 and screw 31 to use them for holding the cup 21 and casing 12 together in either position of the cup relative to the casing.

As is clear from Fig. 3, the sub-frame 28 is mounted within the casing 12 by four bolts 30, two of which are located in the bottom of the casing 12 and the other two near the top thereof. When the cup 21 is in the lower, or full-line (Fig. 3) position, relative to the casing 12, the lower pair of bolts 30 pass through the bottom of the cup and secure it to the casing; and when the cup 21 is in the dotted-line position, it is held to the casing 12 by means of the upper pair of bolts 30. As an additional means for securing the cup 21 to the casing 12, we may employ the screw 31 which passes through alined openings in the wall of the cup and casing into either of two screw-threaded holes in the sub-frame 28, one of such holes being located above and the other below the opening in which the contact blocks 29 are disposed.

The bushing 17 serves not only as a common means for mounting the casings 11 and 12 but also serves as a conduit through which may pass the electrical wiring 35 by which the apparatus within the casing 11 is connected to that in the casing 12. Desirably, the cable 35 is made materially longer than necessary, the excess length being coiled within the cups 20 and 21. This excess cable length permits the clamp bolts 26 to be loosened and the casing 12 to be removed from its position of mounting for inspection, adjustment, or repair while the apparatus within it is still electrically connected to the apparatus in the casing 11. Similarly, the excess cable length within the cups 20 and 21 may be availed of to permit the withdrawal of the electrical apparatus in the casing 11. Further, the bushing 17 and cups 20 and 21, which will preferably be of metal, by reason of their electrical connection to the metal dash 10, will serve as a grounded shield for the cable 35.

Other electrical connections from the apparatus within the casing 12, such as those to a battery and those to a control unit 37, may lead through rubber bushings 38 located in the slots 23 in the wall of the cup 21.

The two mounting bushings at the top of the casing 11 may be employed for the passage of wires or control elements leading from the apparatus within the casing 11 to a point in rear of the dash. As shown in the drawings, an antenna lead 40 extends through the bushing 15, which serves as a grounded shield for it; while the bushing 16 provides for the passage of a Bowden-wire connection 41 between the control unit 37 and tuning elements (not shown) within the casing 11.

It will be apparent from the construction described that, with a fixed pattern for the three holes in the dash through which the bushings 15, 16, and 17 pass, the casing 12 can be located in any of various positions relative to the casing 11. This permits a measure of independence between the respective locations of the casings 11 and 12, which is highly desirable in making for universality of installation in different makes of automobiles. Further, since all wiring and control means extending between opposite sides of the dash pass through the bushings, no extra holes need be made in the dash for such elements.

We claim as our invention:

1. Mounting and shielding means for an automobile-radio, comprising two casings of conducting material adapted respectively to contain portions of the radio set and located on opposite sides of the dash of the automobile, a mounting member for the casing on the rear side of the dash, said mounting member and its associated casing being provided with interfitting cylindrical flanges of conducting material, means for clamping said two flanges together, a bushing of conducting material extending through said dash, through the rear wall of the casing in front of the dash, and through a hole in said mounting member, the cylindrical flange on said mounting member being eccentric to said bushing, the casing in rear of the dash being provided with an opening within its associated cylindrical flange, and electric wiring interconnecting the portions of the radio set in the respective casings, said wiring extending through said bushing and through the space within said flanges and including an excess length contained in the space within said flanges.

2. Mounting and shielding means for an automobile-radio, comprising two casings of conducting material adapted respectively to contain portions of the radio set and located on opposite sides of the dash of the automobile, a mounting member for the casing on the rear side of the dash, said mounting member and its associated casing being provided with interfitting cylindrical flanges of conducting material, means for clamping said two flanges together, a bushing of conducting material extending through said dash, through the rear wall of the casing in front of the dash, and through a hole in said mounting member, the casing in rear of the dash being provided with an opening within its associated cylindrical flange, and electric wiring interconnecting the portions of the radio set in the respective casings, said wiring extending through said bushing and through the space within said flanges and including an excess length contained in the space within said flanges.

3. Mounting and shielding means for an automobile-radio, comprising two casings of conducting material adapted respectively to contain portions of the radio set and located on opposite sides of the dash of the automobile, a mounting member for the casing on the rear side of the dash, said mounting member and its associated casing being provided with interfitting cylindrical flanges of conducting material, means for clamping said two flanges together, a bushing of conducting material extending through said dash, through the rear wall of the casing in front of the dash, and through a hole in said mounting member, the cylindrical flange on said mounting member being eccentric to said bushing, the casing in rear of the dash being provided with an opening within its associated cylindrical flange, and electric wiring interconnecting the portions of the radio set in the respective casings, said wiring extending through said bushing and through the space within said flanges.

4. Mounting and shielding means for an automoblie-radio, comprising two casings of conducting material adapted respectively to contain portions of the radio set and located on opposite sides of the dash of the automobile, a mounting member for the casing on the rear side of the dash, said mounting member and its associated casing being provided with interfitting cylindrical flanges of conducting material, means for clamping said two flanges together, a bushing of conducting material extending through said dash, through the rear wall of the casing in front of the dash, and through a hole in said mounting member, the casing in rear of the dash being provided with an opening within its associated cylindrical flange, and electric wiring interconnecting the portions of the radio set in the respective casings, said wiring extending through said bushing and through the space within said flanges.

5. Mounting means for an automobile-radio, comprising two casings respectively adapted to contain portions of the radio set and located on opposite sides of the dash of the automobile, a mounting member for the casing on the rear side of the dash, said mounting member and its associated casing being interconnected for relative angular adjustment about an axis transverse to the dash of the automobile, and a clamping member extending through the dash for securing thereto said mounting member and the casing in front of the dash, said clamping member being eccentric to the axis of angular adjustment of the mounting member and its associated casing.

6. Mounting means for an automobile-radio, comprising two casings respectively adapted to contain portions of the radio set and located on opposite sides of the dash of the automobile, a mounting member for the casing on the rear side of the dash, and a clamping member extending through the dash for securing thereto said mounting member and the casing in front of the dash, said mounting member being rotatable about the axis of said clamping member to vary the relative positions of said two casings.

7. The invention set forth in claim 5 with the addition that said clamping member is hollow to permit the passage through it of wiring leading from one side of the dash to the other.

8. The invention set forth in claim 6 with the addition that said clamping member is hollow to permit the passage through it of wiring leading from one side of the dash to the other.

9. Mounting and shielding means for a dash-mounted automobile radio, comprising a casing of conducting material adapted to contain at least a part of the radio set, and means for securing said casing to the dash, said means comprising one or more bushings of conducting material extending through the dash and through a wall of said casing and secured to said dash and casing.

10. In a dash-mounted automobile radio, a casing enclosing a portion of the radio set comprising electrical apparatus, a member secured to said casing and extending through and secured to the dash to support the casing, said member having a passage through it, and one or more electrical wires associated with the radio set and extending through said passage from one side of the dash to the other.

11. In a dash-mounted automobile radio, a casing enclosing a portion of the radio set comprising electrical apparatus, a member secured to said casing and extending through and secured to the dash to support the casing, said member having a passage through it communicating with the interior of said casing, and one or more electrical wires associated with the radio set and extending through said passage from one side of the dash to the other.

12. In a dash-mounted automobile radio, a casing enclosing a portion of the radio set including an adjustable element, a member secured to said casing and extending through and secured to the dash to support the casing, said member having a passage through it, and adjusting means for said adjustable element, said adjusting means including a movable power-transmitting element extending through said passage.

13. In a dash-mounted automobile radio, a casing enclosing a portion of the radio set including an adjustable element, a member secured to said casing and extending through and secured to the dash to support the casing, said member having a passage through it communicating with the interior of said casing, and adjusting means for said adjustable element, said adjusting means including a movable power-transmitting element extending through said passage.

14. Mounting means for an automobile-radio, comprising two casings respectively containing portions of the radio set and located on opposite sides of the dash of the automobile, a member extending through and secured to the dash, said member being rigidly attached to one of said casings, and adjustable means supporting the other of said casings from said member.

15. The invention set forth in claim 14, with the addition that said member has a passage through it through which wiring associated with the radio set may pass.

16. In a dash-mounted automobile radio, a casing enclosing at least a part of the radio set, a member extending through and secured to the dash, and adjustable means supporting said casing from said member, said member having a passage through it through which wiring associated with the radio set may pass.

17. Mounting means for an automobile radio set having two casings respectively adapted to contain parts of the radio set and located on opposite sides of the dash, comprising two mounting members operatively interconnecting for relative rotative movement, means for securing one of said mounting members to one of said casings in any of a plurality of positions, and a clamping member for securing the other of said casings and the other of said mounting members to the dash of the automobile, the axis of relative rotation of said two mounting members being eccentric to said clamping member.

18. In an automobile radio set, a casing adapted to contain at least part of the apparatus constituting such radio set, a support, a mounting member secured to said support and angularly adjustable relatively thereto, an intermediate member secured to said mounting member and angularly adjustable relatively thereto about an axis parallel to but spaced from the axis about which the mounting member is angularly adjustable, and means for securing said intermediate member to said casing in any of a plurality of positions.

EARL C. BOOTH.
WALTER E. PEEK.